1,875,585

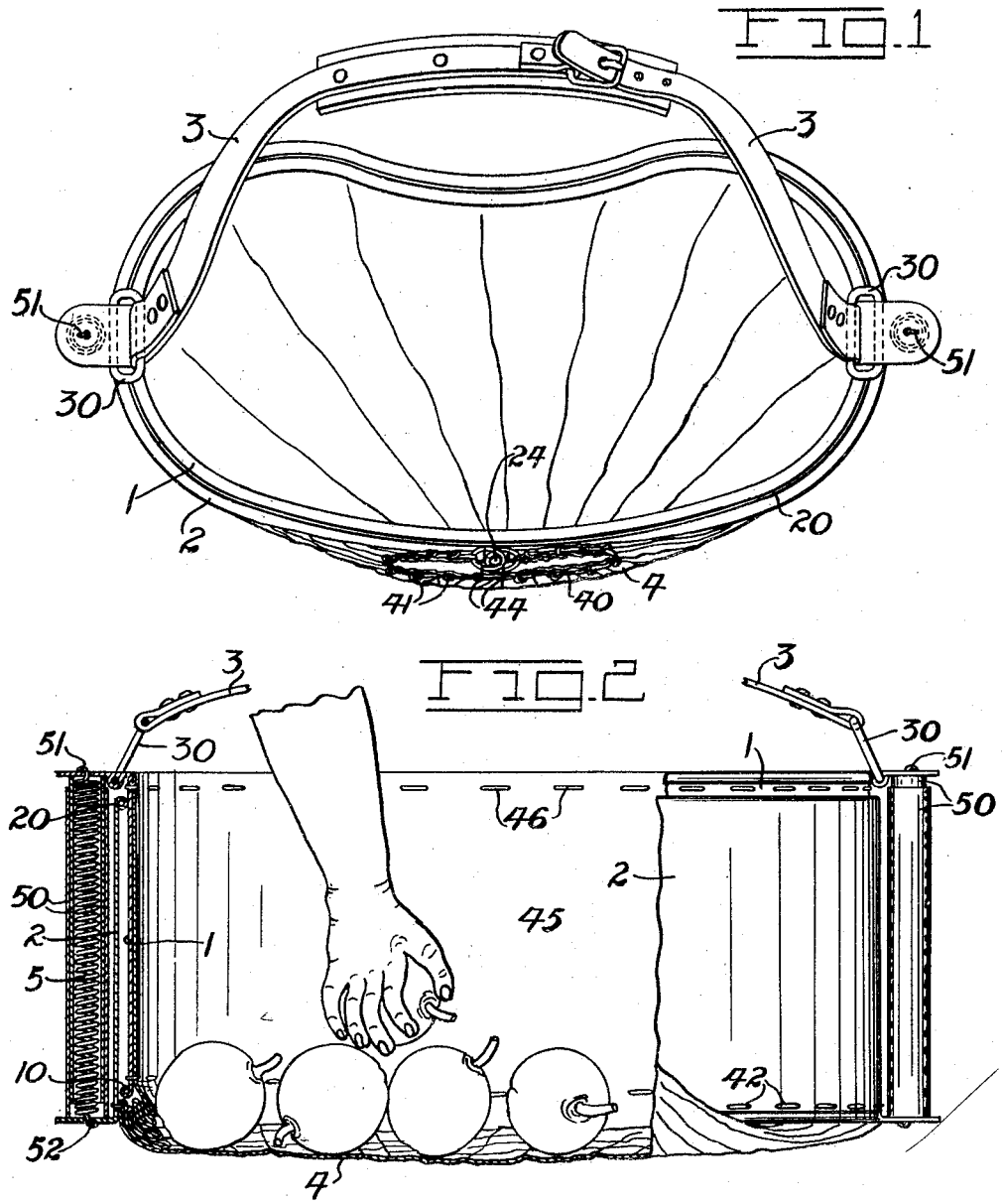

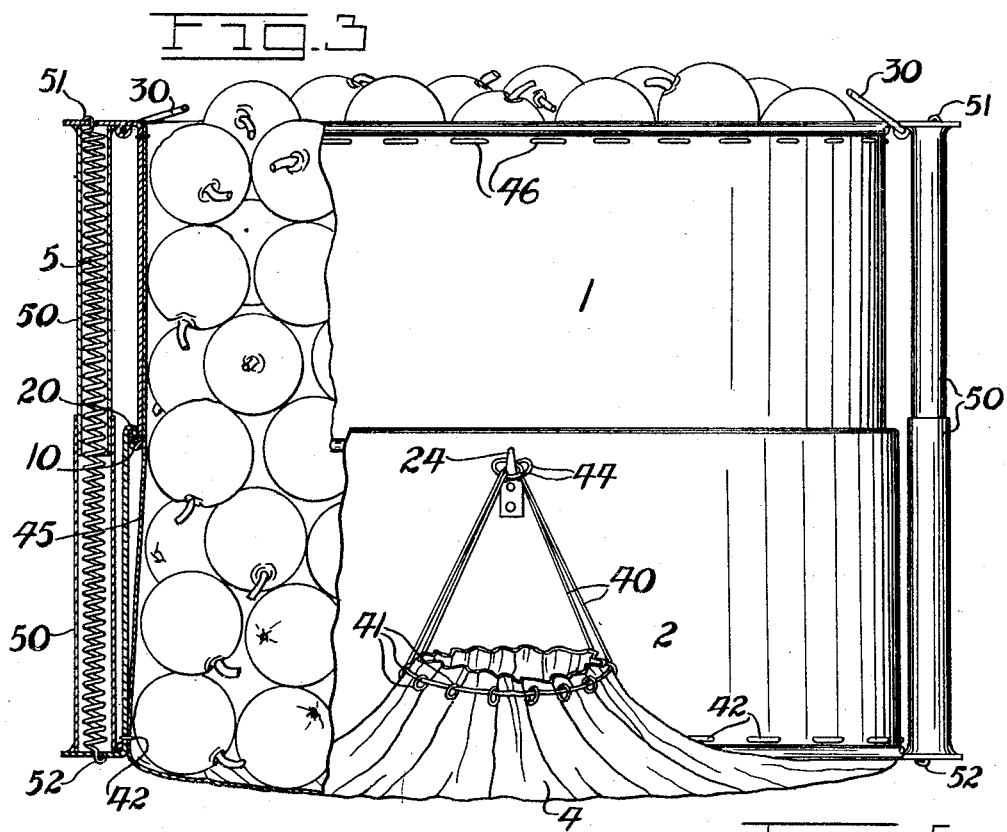
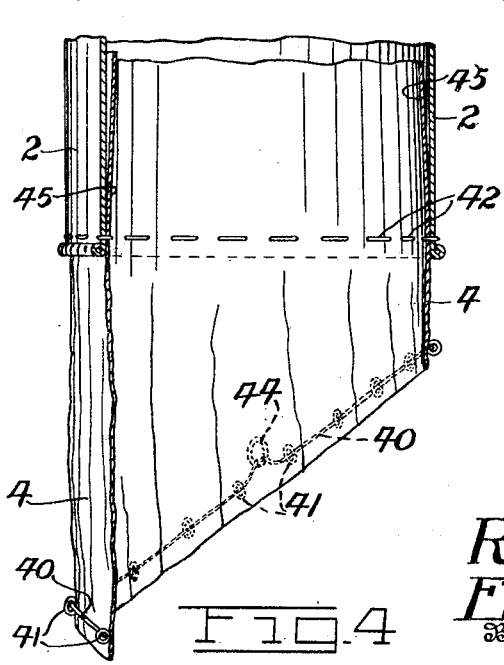
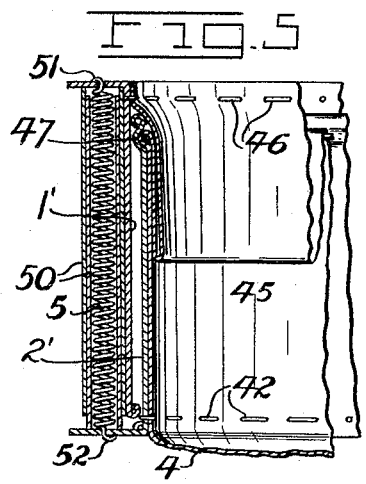
Inventor
Raymond C. Freimann
Earl Evans
By Charles L. Reynolds
Attorney Patented Sept. 6, 1932

UNITED STATES PATENT OFFICE

RAYMOND C. FREIMANN, OF TIETON, AND EARL EVANS, OF YAKIMA COUNTY, WASHINGTON

FRUIT PICKER'S BUCKET

Application filed November 12, 1930. Serial No. 495,171.

Our invention relates to friut-picking buckets, such as are commonly used by pickers of tree fruits, for instance, apples. It will be found useful in the picking of other such fruits.

Apples are picked by pickers who are paid by the box, and whose interest, therefore, is in picking as many apples as possible in a given time. In picking they stand upon ladders and carry buckets slung over their shoulders, into which the fruit is placed, and from which it is discharged when full. The picker is desirous of picking as long as possible before he must go to the collecting point to unload his bucket, and therefore requires a bucket of considerable capacity, but it has been found that, with buckets of sufficient capacity, the tendency of the picker is to drop the fruit into the bucket, rather than to take the time to reach down to the bottom of the bucket when it is empty or nearly so, with the result that the apples strike one another and are bruised, or have their skins punctured by the stems of other apples falling upon them. This considerably reduces the grade of the apple, and results in an economic loss.

The object of our invention, therefore, is to provide a bucket for the use of such pickers, which shall, when empty, be of such shallow depth that it is an easy matter for the picker, without loss of time, to lay the fruit upon the bottom, and in which the bottom recedes under the weight of the fruit accumulating in the bucket, so that at all times, the level where the fruit is to be placed is within easy reach of the picker, and there is a tendency for all fruit to be more carefully laid upon the fruit below it, to the improvement of the grade of all of the fruit. It is also an object to combine with such a bucket the fabric chute which is customary in connection with fruit buckets or fruit-picking bags, whereby the bucket may be discharged through the bottom with the minimum of danger of damage to the fruit, and to associate with such a bottom a means to assist in the support of the fruit on the telescoping parts of the bucket itself.

Another object is to provide such a bucket as this which is inexpensive in construction, and which is not likely to be easily damaged.

Our invention comprises those novel features and combinations which are shown in the accompanying drawings, described in the specification, and which will be more particularly pointed out in the claims which terminate the same.

In the accompanying drawings we have shown our invention embodied in a form which we now prefer, it being understood that various changes may be made in the form and arrangement of the parts within the scope of the appended claims, and without departing from the spirit of our invention.

Figure 1 is a plan view of our bucket.

Figure 2 is a partial front elevation and partial section on a vertical plane, taken from side to side of the bucket, showing the manner of placing fruit therein when the bucket is nearly empty.

Figure 3 is a view similar to Figure 2, showing how the parts of the bucket will be extended as the fruit collects therein.

Figure 4 is a section from front to rear through the bottom of the bucket and the associated chute or bottom.

Figure 5 is a section through one end of a modified form of the bucket.

Essentially, our bucket consists of two telescoping sleeves, 1 and 2. These are so arranged that they may be telescoped into the position shown in Figure 2, where one is alongside the other and the depth of the bucket is substantially half the depth of the standard bucket, that is, the depth of one section only. As guide means, and to prevent the bucket 2, which is the lowermost, from slipping off from the bucket 1, complemental flanges 10 and 20 may be provided, these acting as stops when the buckets are extended. The extended position of parts is shown in Figure 3.

Means to suspend the bucket from the shoulder of the picker are secured to the upper section 1, these means comprising usually a sling 3, which may be of any of the types now in common use. This would usually be secured to rings 30 at the sides and at the upper edge of the section 1.

The two sleeves 1 and 2 are open-ended, and to close the bottom of the bucket and support the fruit, we employ a form of fabric chute which is common to fruit-pickers' buckets, this being illustrated at 4. It is secured to the lower edge of the lower section 2, the securing means being indicated by lacing 42. To enable the closing of this chute to constitute a bottom, a drawstring 40 may be threaded through rings 41 in the lower edge of the chute 4, and securing rings 44 may be employed, these being adapted to engage over a hook 24, upon the lower section 2, by means of which the drawstring 40 may be held drawn tight, and the chute held up so that apples may not escape through the chute until the hooked securing rings 44 are released.

To hold the two sleeves telescoped, one within the other, under normal conditions, that is, when the bucket is empty, we provide an extension spring or springs 5, one end of which is secured to the upper edge of the upper section 1, as indicated at 51, and the opposite end of which is secured to the lower edge of the lower section 2, as indicated at 52. To protect this spring, it may be surrounded by telescoping tubular guards 50.

The strength of the springs 5 is so calculated that the bottom 4 of the bucket will be held at about the level of the lower edge of the upper sleeve 1 when the bucket is empty, or when there is only a small amount of fruit therein, as may be seen in Figure 2. This bottom then is within easy reach of the picker, who extends his arm through the open top of the bucket, and lays the fruit carefully upon the bottom, or upon the fruit which covers the bottom. As the weight of fruit increases, the springs 5 will be extended, and the top level of fruit may creep somewhat closer to the top edge of the upper section 1, but not until the bucket is substantially filled with fruit, as seen in Figure 3, will the springs and the telescoping sections be fully extended, to the depth of the standard fruit-picking bucket.

To protect the fruit from contact with the metal of which the sleeves are made and from contact with the lower edge of the inner, upper section 1, there may be a flexible liner 45 secured to the upper edge of the inner section, as indicated by the lacing 46, and secured to the lower edge of the lower section 2, but of such length as to permit full extension of the two sections. It is convenient to form this liner and the bottom 4 of one integral piece, and in consequence, the lacing 42 will serve a dual purpose, to hold the lower edge of the liner 45 and to support the bottom or chute 4 from the bucket section 2. This liner assist the stops 10 and 20 to prevent undue extension of the sections.

In Figure 5, the upper section 1' is shown as the outer of the two sections, and the section 2', which is the lower section when the bucket is extended, lies inside of the section 1'. In this form the liner 45, in addition to being secured at 46 and at 42, is secured between these points to the upper edge of the lower section 2, thus taking up some of the accumulation of folds which will gather at the bottom of the bucket when in the position of Figure 2. Such intermediate securing means is indicated by the spring-retaining hoop 47.

What we claim as our invention is:

1. A fruit pickers bucket comprising two or more telescoping sleeves, suspending means secured to the upper sleeve, a releasable bottom secured to the lower sleeve, and spring means normally holding the sleeves telescoped, but yieldable under the weight of fruit supported from the bottom to permit extension of the lower section below the upper.

2. A fruit picker's bucket comprising two telescoping sleeves of substantially half the standard depth, suspending means secured to the upper sleeve, a releasable bottom secured to the lower sleeve, spring means normally holding the sleeves telescoped, but yieldable under the weight of fruit supported upon the bottom to permit extension of the lower section below the upper to a combined depth substantially that of a standard bucket and flexible protective liner extending from the top of the upper sleeve to the bottom of the lower sleeve, when the sleeves are extended.

3. A fruit picker's bucket comprising two telescoping sleeves, suspending means secured to the upper sleeve, a fabric liner secured to the upper edge of the upper section and to the lower edge of the lower section, said liner extending through the sleeves and of a length to permit their full extension, and terminating beneath the connection to the lower sleeve in an open-ended chute, means for closing said chute to form a fruit-supporting bottom, and spring means normally holding the sleeves telescoped, but yieldable to permit ultimate full extension of the sleeves under the weight of fruit therein.

4. A fruit picker's bucket comprising two sleeves telescoping one inside the other, a sling secured to the inner sleeve, an open-ended fabric chute secured to the lower edge of the outer sleeve, a draw string to close the chute, means upon the outer sleeve to hold said string drawn up, and spring means normally holding the sleeves telescoped, but yieldable to permit ultimate full extension of the sleeves under the weight of fruit resting upon the closed chute.

Signed at Tieton, Yakima County, Washington, this 7th day of November, 1930.

RAYMOND C. FREIMANN.
EARL EVANS.